Nov. 18, 1924.  1,516,201
O. NEBEL
ANIMAL TRAP
Filed Nov. 30, 1923
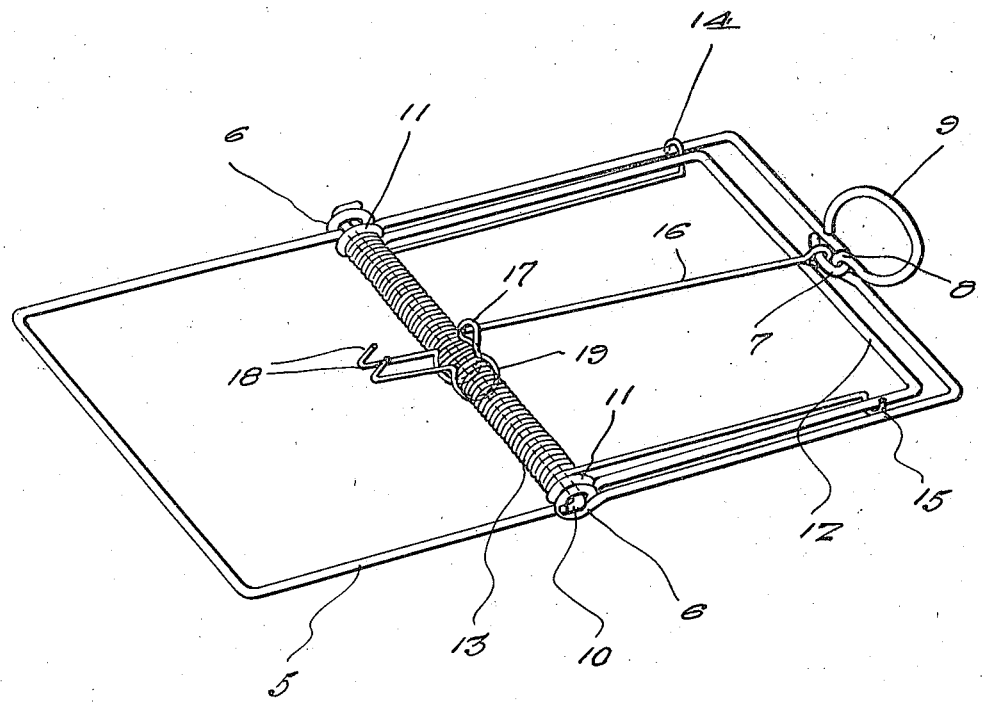
Oscar Nebel
Inventor Patented Nov. 18, 1924.

1,516,201

UNITED STATES PATENT OFFICE.

OSCAR NEBEL, OF HURON, SOUTH DAKOTA.

ANIMAL TRAP.

Application filed November 30, 1923. Serial No. 677,707.

*To all whom it may concern:*

Be it known that I, OSCAR NEBEL, citizen of the United States, residing at Huron, in the county of Beadle and State of South Dakota, have invented certain new and useful Improvements in Animal Traps, of which the following is a specification.

This invention relates to certain new and useful improvements in animal traps, and has particular reference to jaw traps.

The primary object of the invention is to generally simplify and improve jaw traps of the above kind whereby the same may be easily set, may be cheaply and easily manufactured and will be extremely durable and efficient in operation.

Another object is to provide simplified and improved means for retaining the trip rod in position for holding the swinging jaw in its set position and for releasing the same upon the bait being disturbed.

Other objects will appear as the nature of the invention is better understood, and the same consists in the novel form, combination, and arrangement of parts hereinafter more fully described, shown in the accompanying drawing and claimed.

In the drawing, the view is a perspective view of a jaw trap constructed in accordance with the present invention and with the swinging jaw in set position.

Referring more in detail to the drawing, the present invention embodies an elongated open rectangular frame 5 composed of a single length of wire bent to provide transversely aligned eyes 6 substantially midway of the length of the sides of the frame 5, and interlocked eyes 7 and 8 at one end of the frame, one end of the wire being extended from the eye 8 and formed in an outwardly directed handle loop 9. A transverse rod 10 has its ends suitably secured in the aligned eyes 6, preferably by directing the ends of the rods laterally as shown, and journalled upon the end portions of the rod 10 at the inner sides of the eyes 6, are eye members 11 formed upon the ends of a substantially U-shaped wire jaw member 12. The jaw member 12 is formed to cooperate with the end of the frame 5, opposite that adjacent which the handle 9 is located to retain the animal in a manner that is well known in the art and for swinging the jaw member 12 toward this end of the frame, a coil spring 13 is mounted upon the rod 10 and has one end extended along a side of the frame 5 and provided upon its free end with an outturned hook 14 engaged with said frame, the other end of the spring being extended along one side of the jaw 12 at the opposite side of the frame and terminating in an outwardly directed hook 15 engaged with the adjacent side of the jaw 12.

The eye 7 is made slightly larger than the eye 8, so as to accommodate a freely swinging trip rod 16 that has an eye at one end for interlocking engagement with the eye 7.

A special form of bait holder and trip lever is provided for engaging the free end of the rod 16 when the same is disposed in position overlying the central portion of the jaw 12 for retaining the latter in set position as shown in the drawings. This bait holder and trip lever comprising a single length of wire centrally return bent to provide a loop 17, in which the free end of the rod 16 may be engaged when the jaw 12 is set, the free ends of the bait holding trip lever being upturned as indicated at 18 to permit the bait being fastened thereon. This bait holding trip lever has transversely aligned portions of its legs outwardly curved as at 19 to fit the spring 13 and substantially embrace the latter whereby said lever is pivotally attached to the spring for vertical swinging movement. By reason of this construction, the bait holding trip lever may be slid onto the spring 13 from one end of the latter to its proper position centrally of the spring as shown, whereby quick assembly of these parts is had without requiring a special mounting for the trip lever or special fastening means such as pivot pins or the like for its installation.

In operation, the jaw 12 is swung against the action of a spring 13 to the position shown in the figure and while being held in this position, by engaging the handle 9 and the adjacent central portion of the jaw 12 between the thumb and forefinger, the rod 16 is swung downwardly to a horizontal position, after which the bait holding trip lever is swung so as to spring the loop 17 thereof into engagement with the free end of the rod 16, thereby holding said rod against upward movement for retaining the jaw 12 set as shown. The bait having been previously placed upon the prongs or upturned ends 18 of the trip lever, it will be seen that should the animal attempt to remove the same from the trip lever, the latter will be sufficiently tilted to release the loop 17 of the lever from the rod 16, whereupon the spring 13 will act to swing the jaw 12 toward the opposite end of the frame 5, whereby the animal is effectively caught between said last mentioned end of the frame and the jaw 12.

From the above description, it is believed that the construction and operation, as well as the advantages of the present invention will be readily understood and appreciated by those skilled in the art.

What I claim as new is:

In a jaw animal trap, an open elongated substantially rectangular frame formed of a single length of wire bent to provide transversely aligned eyes substantially at the central portions of the sides of the frame, a transverse rod having its ends secured in said eyes, a U-shaped jaw member having its ends journalled upon the transverse rod at the inner sides of said eyes, a spring encircling the rod and having ends engaging the sides of the jaw and frame for causing the jaw to swing toward one end of the frame for gripping an animal therebetween, means including a bait holding trip lever mounted upon the spring for retaining the jaw in a retracted set position against the action of said spring, the ends of the length of wire forming the frame being provided with interlocking eyes at one end of the frame, the means for holding the swinging jaw set further including a rod pivoted at one end to one of the last named eyes and having its free end adapted for retaining engagement by the trip lever, one end of the wire forming the frame being extended from the eye thereof in the form of an outwardly extending handle loop.

In testimony whereof I affix my signature.

OSCAR NEBEL.